United States Patent
Sloop et al.

(10) Patent No.: US 8,067,107 B2
(45) Date of Patent: Nov. 29, 2011

(54) SYSTEM AND METHOD FOR PROCESSING AN END-OF-LIFE OR REDUCED PERFORMANCE ENERGY STORAGE AND/OR CONVERSION DEVICE USING A SUPERCRITICAL FLUID

(75) Inventors: Steven E. Sloop, Bend, OR (US); Robert Parker, Bend, OR (US)

(73) Assignee: Eco-Bat Indiana, LLC, Indianapolis, IN (US)

( * ) Notice: Subject to any disclaimer, the term of this patent is extended or adjusted under 35 U.S.C. 154(b) by 1002 days.

(21) Appl. No.: 11/004,643

(22) Filed: Dec. 2, 2004

(65) Prior Publication Data
US 2005/0244704 A1 Nov. 3, 2005

Related U.S. Application Data

(63) Continuation-in-part of application No. 10/340,358, filed on Jan. 9, 2003, now Pat. No. 7,198,865.

(60) Provisional application No. 60/347,216, filed on Jan. 9, 2002, provisional application No. 60/526,701, filed on Dec. 2, 2003.

(51) Int. Cl.
| | |
|---|---|
| *H01M 6/50* | (2006.01) |
| *H01M 2/36* | (2006.01) |
| *H01M 10/42* | (2006.01) |
| *H01M 2/12* | (2006.01) |
| *H01M 10/54* | (2006.01) |

(52) U.S. Cl. ............... 429/49; 429/52; 429/95; 29/623.1
(58) Field of Classification Search .................... 429/49, 429/95; 29/623.1
See application file for complete search history.

(56) References Cited

U.S. PATENT DOCUMENTS

| 5,185,564 | A |   | 2/1993  | Miller |
|---|---|---|---|---|
| 5,208,526 | A | * | 5/1993  | Goldman et al. ............. 320/128 |
| 5,847,538 | A |   | 12/1998 | Yoshimatsu |
| 5,856,738 | A |   | 1/1999  | Yoshimatsu |
| 5,888,463 | A |   | 3/1999  | McLaughlin et al. |
| 6,024,856 | A | * | 2/2000  | Haydu et al. .................... 205/84 |
| 6,080,508 | A |   | 6/2000  | Dasgupta et al. |
| 6,273,921 | B1 | * | 8/2001 | Stanford et al. ............. 29/623.1 |
| 6,284,412 | B1 |   | 9/2001  | Minakata et al. |

(Continued)

FOREIGN PATENT DOCUMENTS

| EP | 1056146 | 11/2000 |
|---|---|---|
| WO | WO 02/23651 | 3/2002 |
| WO | WO0223651 | 3/2002 |

OTHER PUBLICATIONS

*The Role of Li-Ion Battery Electrolyte Reactivity in Performance Decline and Self-Discharge*, Sloop et al., *Journal of Power Sources*, vols. 119-121, pp. 330-337, 2003.

(Continued)

*Primary Examiner* — Barbara Gilliam
*Assistant Examiner* — Angela Martin
(74) *Attorney, Agent, or Firm* — K&L Gates LLP (57) ABSTRACT

A method of refurbishing a lithium-containing energy storage and/or conversion device is disclosed, wherein the energy storage and/or conversion device includes electrodes and an electrolyte, and wherein the method includes substantially removing the electrolyte from the energy storage and/or conversion device, substantially removing waste products from surfaces of the electrodes, and adding a new quantity of electrolyte to the energy storage and/or conversion device.

24 Claims, 4 Drawing Sheets

U.S. PATENT DOCUMENTS

| | | | |
|---|---|---|---|
| 6,329,096 B2 | 12/2001 | Kawakami et al. | |
| 6,447,669 B1 | 9/2002 | Lain | |
| 6,844,103 B2 | 1/2005 | Lee et al. | |
| 2001/0000889 A1* | 5/2001 | Yadav et al. | 204/242 |
| 2007/0196725 A1 | 8/2007 | Tedjar et al. | |

OTHER PUBLICATIONS

Syntheses of Conductive Polypyrrole/Polyurethane Foams via a Supercritical Fluid Process, Fu et al., *Macromolecules*, vol. 30, pp. 7611-7613, 1997.

A Laboratory-Scale Lithium-Ion Battery Recycling Process, Contestabile et al., *Journal of Power Sources*, vol. 92, pp. 65-69, 2001.

Chemical Reactivity of $Pf_5$ and $LiPF_6$ in Ethylene Carbonate/Dimethyl Carbonate Solutions, Sloop et al., *Electrochemical and Solid-State Letters*, vol. 4, No. 4, pp. A42-A44, 2001.

The Role of Li-Ion Battery Electrolyte Reactivity in Performance Decline and Self-Discharge, Sloop et al., *Journal of Power Sources*, vols. 119-121, pp. 330-337, 2003.

* cited by examiner

SYSTEM AND METHOD FOR PROCESSING AN END-OF-LIFE OR REDUCED PERFORMANCE ENERGY STORAGE AND/OR CONVERSION DEVICE USING A SUPERCRITICAL FLUID

CROSS-REFERENCES TO PRIORITY APPLICATION

This application is a continuation-in-part of U.S. patent application Ser. No. 10/340,358, filed Jan. 9, 2003, now U.S. Pat. No. 7,198,865, which claims priority from U.S. Provisional Patent Application Ser. No. 60/347,216, filed Jan. 9, 2002, and is also based upon and claims the benefit under 35 U.S.C. §119(e) of U.S. Provisional Patent Application Ser. No. 60/526,701, filed Dec. 2, 2003. All of the above applications are hereby incorporated by reference in their entireties for all purposes.

TECHNICAL FIELD

The present disclosure relates to a system and method for processing an end-of-life or reduced performance lithium containing energy storage and/or conversion device via a supercritical fluid.

BACKGROUND

Lithium batteries are important power sources for many consumer electronics devices and constitute a multibillion-dollar market. Part of the reason for continued market growth is that lithium battery technology is replacing Ni—Cd and metal hydride technology in portable consumer electronics. The low volumetric energy density for lithium allows for small volume, high capacity battery design in comparison to Ni—Cd and metal hydride batteries.

Typical lithium batteries may be classified as either primary or secondary lithium batteries. Both of these types, like all batteries, have an electrolyte, anode and cathode. Primary lithium batteries typically utilize a lithium metal anode and a metal oxide (for example, $MnO_2$) cathode. The primary lithium battery operates via the following half-reactions:

Anode reaction: $Li \rightarrow Li^+ + e^-$ (1)

Cathode reaction: $Li^+ + e^- + MnO_2 \rightarrow LiMnO_2$ (2)

This redox reaction is irreversible. Therefore, batteries constructed with these materials cannot be recharged.

Secondary lithium batteries typically utilize a $Li_xC_6$ anode and a $Li_{(1-x)}CoO_2$ cathode. $Li_xC_6$ is lithium-intercalated graphitic carbon, which hereinafter may be referred to as "reduced graphite." Its reactivity is similar to lithium metal. The secondary lithium battery operates via the following half-reactions:

Anode reaction: $Li_xC_6 \rightarrow C_{6(bulk\ graphite)} + xLi^+ + xe^-$ (3)

Cathode reaction: $xLi^+ + xe^- + Li_{(1-x)}CoO_2 \rightarrow LiCoO_2$ (4)

This particular redox-couple produces 3.6 V. Furthermore, the reaction is reversible. Therefore, the application of −3.6V to the cell pushes the lithium-ions back into the carbon. Lithium cobalt oxide and graphitic carbon are utilized in rechargeable lithium-ion batteries. Ultimately, these devices have a common feature: both require the use of non-aqueous electrolytes to avoid unwanted side reactions in the device.

The vast majority of electrolyte used in "lithium-ion" batteries is composed of a lithium salt dissolved in an alkyl carbonate. One of the most common electrolytes includes the salt $LiPF_6$ dissolved in ethylene carbonate and diethyl carbonate (1.2 M $LiPF_6$ in 1:1 EC:DEC). Other formulations may substitute ethyl methyl carbonate for DEC or include a third solvent such as butyrolactone. Various additives may be included for performance enhancement. Furthermore, fluorinated esters or fluorinated alkyl phosphates may be added as a flame retardant to address flammability issues. A small number of "gel" or "polymer electrolyte" (lithium-polymer) systems exist in which a polymer supports a liquid electrolyte (of similar composition described above). These rechargeable systems use anodes made of graphitic carbon and cathodes composed of $Li_xCo_yO_2$, $LiCo_xNi_yO_2$, $LiCo_xMn_yNi_zO_2$ or $MnO_2$. Finally, a unique rechargeable system departs from the use of graphitic carbon. The Li—S cell uses a lithium metal anode, polymer electrolyte and sulfur cathode.

Improvements in cycle life, safety and thermal stability of lithium battery technology has accelerated the use of these batteries as portable power sources. However, after approximately two years of regular use, these batteries may start to fail. Often the batteries are merely thrown away after failure. However, the batteries may contain toxic or otherwise dangerous component chemicals that make them unsuitable for disposal in a landfill. Furthermore, some of the constituent components may be relatively expensive to produce for use in new batteries. Other lithium-containing power storage devices, such as pseudocapacitors, ultracapacitors, supercapacitors and capacitors, may suffer similar problems.

Due at least in part to these problems, as well as the existence of a significant lithium waste stream, environmental laws, industrial standards and collection services have arisen to help promote lithium battery recycling. These activities help to reduce disposal, and also may help to provide valuable raw materials without compromising precious resources through alternative activities such as mining.

Various recycling schemes for lithium batteries are known. For example, U.S. Pat. No. 5,888,463 to McLaughlin et al. describes a recycling process in which water is used to react with lithium metal to allow the extraction of lithium carbonate from shredded lithium batteries. The process involves many separate steps. First, the batteries are cooled with liquid nitrogen. This may require many hours, and a large input of energy, if the battery mass is relatively large. Next, the batteries are shredded to expose their components, and then water is added to react with the lithium. Metallic lithium or reduced graphite reacts with protic solvents such as water or alcohol to produce H2 according to the following reaction.

$Li + H_2O \rightarrow LiOH + \frac{1}{2}H_2$ (5)

Any $H_2$ produced is burned during processing. Salts are captured through precipitation of saturated solutions, and purification of the solution is achieved across a $Li^+$ exchange membrane. This may require the pH to be adjusted with LiOH and $H_2SO_4$ to avoid the production of $H_2S$ gas. The product recovered from the ion-exchange process is LiOH, which reacts with $CO_2$ gas to produce high purity $Li_2CO_3$. Finally, water is thermally removed from the carbonate product.

The McLaughlin aqueous-based lithium recycling process may suffer various drawbacks. First, the use of cryogenic liquid nitrogen to cool the batteries may be expensive and time-consuming. Second, the hydrogen gas produced in the reaction of lithium with water may pose an explosion hazard. Third, poisonous $H_2S$ gas may be produced in the reaction mixture. Fourth, the thermal removal of water from the carbonate product may be energy intensive. Fifth, the process produces aqueous waste that may require disposal under expensive permits. Sixth, the water may compromise the functionality of the electrolytes, cathodes and anodes as recycled battery materials for use in new batteries.

U.S. Pat. No. 6,329,096 to Kawakami et al. teaches a process for decreasing the conductivity of the battery electrolyte before removal of the electrolyte and further mechanical processing of the battery. The Kawakami method decreases conductivity by lowering the temperature of the cells and extracting electrolyte using a pressurized gas. Further processing may involve the use of a high-pressure aqueous spray to destruct and wash the cell. However, the Kawakami process utilizes irreversible reactions to oxidize lithium, and an aqueous process step to recover battery components.

U.S. Pat. No. 5,185,564 to Miller describes an apparatus to discharge batteries using a circuit and light. The light is used to detect a desired level of discharge. Once the light is out, the battery is determined to be discharged and mechanical processing may commence.

Lithium-ion batteries may be protected from over-discharge to extend their useful life. Examples of over-discharge protection are disclosed in U.S. Pat. Nos. 5,856,738 and 5,847,538 to Yoshimatsu. The over-discharge protection has two implications. First, lithium-ion batteries protected against over-discharge will have a residual charge at their end-of-life. Second, they cannot be simply discharged further because internal battery circuitry will stop the process.

SUMMARY

One embodiment provides a method of processing an energy storage and/or conversion device, wherein the method includes discharging the energy storage and/or conversion device; removing an electrolyte from the energy storage and/or conversion device; exposing the energy storage and/or conversion device to a supercritical fluid to remove waste products from the energy storage and/or conversion device; and adding a new quantity of electrolyte to the energy storage and/or conversion device after removing waste products from the energy storage and/or conversion device.

Another embodiment provides a method of refurbishing a lithium-containing energy storage and/or conversion device, the energy storage and/or conversion device including electrodes and an electrolyte, wherein the method includes substantially removing the electrolyte from the energy storage and/or conversion device; substantially removing waste products from surfaces of the electrodes; and adding a new quantity of electrolyte to the energy storage and/or conversion device.

Yet another embodiment provides, in a hybrid electric or electric vehicle, a method of rejuvenating a battery having faded capacity. The method includes discharging the battery; removing electrolyte from the battery; removing accumulated waste deposits from functional portions of the battery; adding a new quantity of electrolyte to the battery; and recharging the battery.

DETAILED DESCRIPTION OF THE DEPICTED EMBODIMENTS

Figure 1:
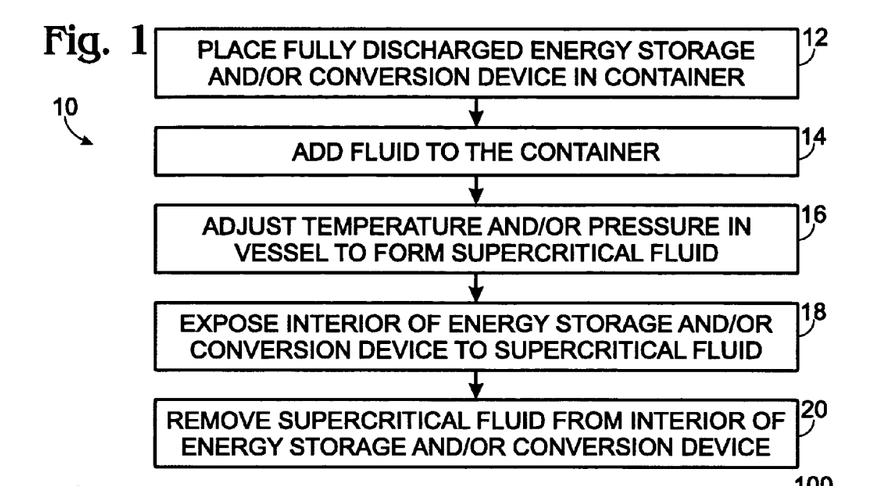
FIG. 1 is a flow diagram of an embodiment of a method for processing an end-of-life or reduced performance lithium-containing energy storage and/or conversion device via a supercritical fluid.

FIG. 1 shows, generally at 10, one embodiment of a method of processing an end-of-life (or reduced performance) lithium-containing energy storage and/or conversion device via a supercritical fluid. Method 10 may be used to remove electrolytes from lithium-containing energy storage and/or conversion devices, such as lithium-containing batteries, capacitors, pseudo-capacitors, supercapacitors and ultracapacitors, and/or may be used to remove buildup of waste products from the surfaces of the battery electrode-electrolyte interfaces that can cause excess internal device impedance. The removal of electrolyte may be used in either a recycling or refurbishment process, and removal of waste products from the surfaces of the battery may be used as an intermediate step in the process of rejuvenating the battery for future use.

Method 10 first includes placing a discharged lithium-containing energy storage and/or conversion device in a treatment container at 12, and then adding a fluid to the container at 14. Next, at least one of the temperature and pressure of the fluid in the container is adjusted at 16 to form a supercritical fluid phase from the fluid in the treatment container. The supercritical phase is a phase that forms at temperatures and/or pressures higher than the critical point for the material, where the liquid/gas phase boundary ceases to exist. The fluid behaves as a dense gas, and may have very different solubility, surface tension, and other fluidic properties than corresponding sub-critical fluids of the same chemical composition. Next, the interior of the energy storage and/or conversion device is exposed at 18 to the supercritical fluid. This may occur by breaching the device walls, or by opening a valve or other resealable opening that allows the supercritical fluid to access the interior of the device. The supercritical fluid may be a nonaqueous or aprotic supercritical fluid to help avoid the production of hydrogen gas during the process. Exposing the interior of the energy storage and/or conversion device to the supercritical fluid may help remove electrolyte from the energy storage and/or conversion device by dissolving the electrolyte in the supercritical fluid and/or physically displacing the electrolyte with the supercritical fluid. Furthermore, exposing the device interior to the supercritical fluid may also help remove oligoether, oligocarbonate, and other waste products from the electrodes and other surfaces within the energy storage and/or conversion device. Electrolyte decomposition produces these waste products, which may precipitate in the separator and on electrodes surfaces. The resulting plaque increases the internal resistance of the cell, making charge and discharge more difficult.

After exposing the electrolyte to the supercritical fluid, the supercritical fluid is removed from the interior of the energy storage and/or conversion device at 20. The electrolyte and/or waste products may then be precipitated from the supercritical fluid by evaporation of the supercritical fluid.

The use of method 10 to process end-of-life lithium-containing energy storage and conversion devices may help to avoid many of the negative aspects of aqueous extraction methods through the use of the non-aqueous, aprotic, supercritical fluid as a solvent. The advantages of method 10 are described herein in the context of $CO_2$, but it will be appreciated that many or all of the advantages described below may also be present when other supercritical fluids are used. First, cooling of the energy storages devices before adding the solvent is not required because some $CO_2$ and a small amount of oxygen react with lithium metal in the sample slowly at ambient temperature to produce solid $Li_2CO_3$. While a completely discharged energy storage device may have essentially no remaining lithium metal, batteries often have some lithium that is disconnected from the battery circuit. Disconnected lithium cannot be removed through simple discharge of the battery. Thus, treating the disconnected lithium with $CO_2$ forms lithium carbonate, which lacks the fire hazard associated with lithium metal. Furthermore, the reaction of the lithium with $CO_2$ does not produce $H_2$ gas, which greatly reduces the risk of explosion.

As mentioned above, oligocarbonate and/or oligoether waste products that tend to form at the electrode-electrolyte boundary from the carbonate electrolyte solvents may be soluble in supercritical $CO_2$ and therefore may be removed from the energy storage and/or conversion device without compromising the anhydrous character of the device. Furthermore, the recovered pure electrolyte may be precipitated from the supercritical fluid solution by simply reducing the pressure of the fluid. This also permits the fluid to be reused in a closed loop system, thus saving expense of using new fluid for each extraction.

For reasons related to safety, it is desirable to fully discharge the energy storage and/or conversion devices before processing the energy storage and/or conversion devices. Devices that are not fully discharged may contain significant quantities of lithium metal, which can ignite when oxidized by air, moisture, etc. during or after processing. Any suitable method may be used to discharge the energy storage and/or conversion devices before processing. For example, the devices may be placed in an aqueous or nonaqueous salt solution of sufficient conductivity to cause discharge. Alternatively, an electrical circuit (for example, a simple resistor) may be connected between the terminals of the energy storage and/or conversion device.

Many lithium-containing energy storage and/or conversion devices include circuitry to protect against over-discharge of the device. In these devices, the use of a simple circuit (such as a resistor) to discharge the device cannot be relied on to discharge the device fully due to the over-discharge protection circuitry. On the other hand, the use of an aqueous or nonaqueous salt solution may be more reliable in discharging these devices fully. For even more certainty, the over-discharge protection circuitry may be removed from the energy storage and/or conversion device before discharging the device.

Furthermore, the over-discharge protection circuitry may be configured to be easily removed from the battery. For example, the circuitry may be attached to a pocket into which the cell would be placed, thereby making contact between the (+) and (−) leads of the battery and circuitry. Alternatively, the circuitry may be fastened to the battery through the use of a fastening device, such as a snap-on device.

Yet another way to discharge the energy storage and/or conversion device fully is to discharge the device via exposure to sub-critical or supercritical $CO_2$. Such a process is related to the chemistry of internal self-discharge for a lithium-ion battery described by Sloop et al. [Sloop, S. E.; Kerr, J. B. *J. Power Sources* 119-121 (2003) 330-337], the disclosure of which is hereby incorporated by reference. The process occurs through cathodic reduction of $CO_2$ to oxalate and anodic oxidation of oxalate to $CO_2$. The reaction acts as an electrochemical shuttle to discharge the cell through incidental accumulation of $CO_2$ from internal side-reactions, and is reversible.

Figure 2:
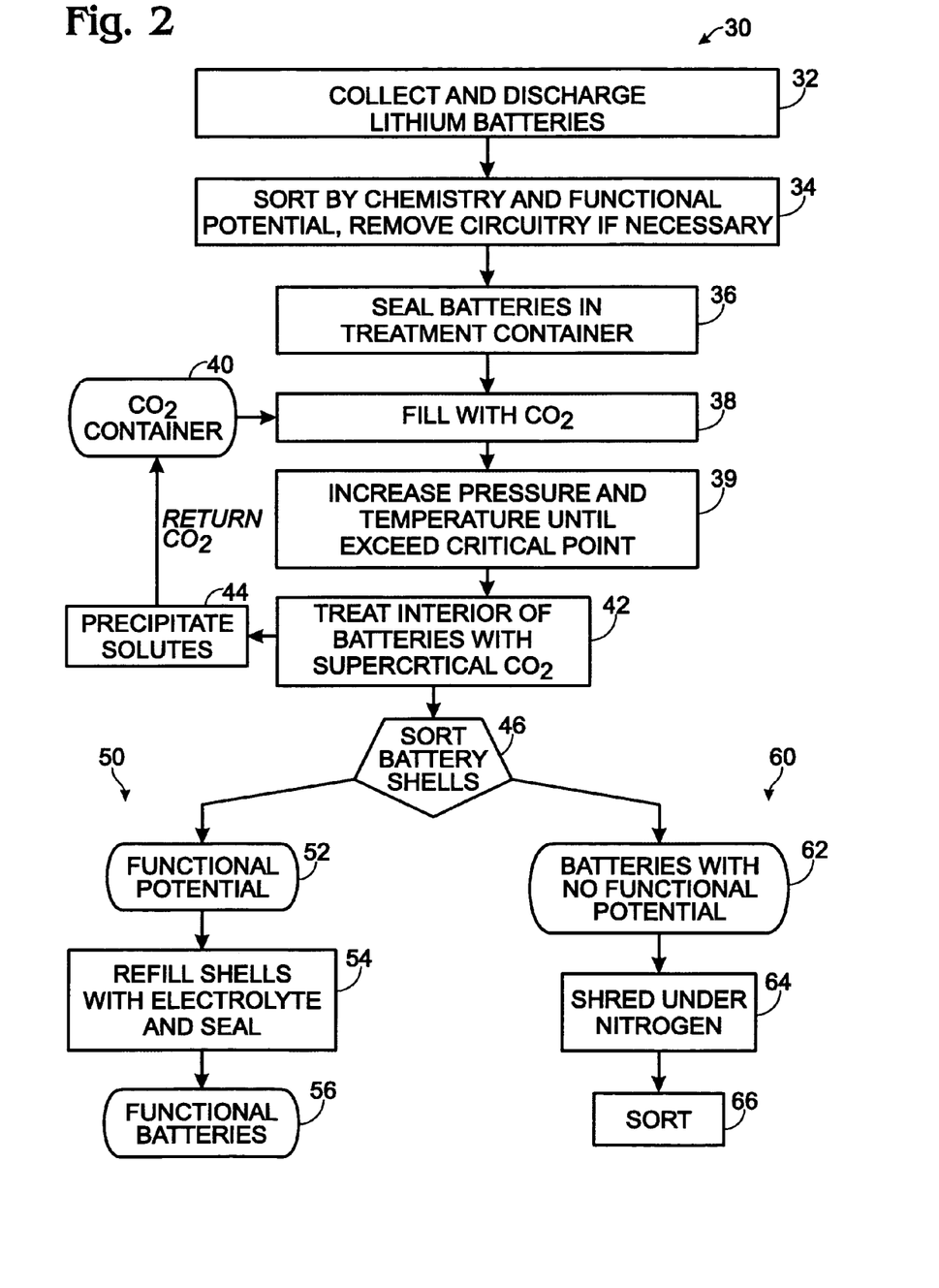
FIG. 2 is a flow diagram of an embodiment of a method for recycling and/or refurbishing an end-of-life or reduced performance lithium-containing energy storage and/or conversion device.

The oxalate/$CO_2$ discharge reaction may occur externally from the cell through solution activity against the electrical contacts of the bare cell. The reaction may occur internally if $CO_2$ is introduced to the cell. Internally, the $CO_2$ permeates the electrolyte and acts to discharge the cell through formation of oxalate at the anode and oxidation of oxalate at the cathode. Either the internal or external use of the $CO_2$-oxalate reduction-oxidation process bypasses the over-discharge protection circuitry to fully discharge the cell. The bypass is achieved through chemical activity within the circuit boundary, a chemical short circuit. Method 10 may be implemented in a variety of ways, and may be used to recover electrolytes from many different types of lithium-containing energy storage devices. FIG. 2 shows, generally at 30, another embodiment of a method of extracting an electrolyte from a lithium-containing energy storage device. Method 30 illustrates a more detailed implementation of the general steps outlined above for method 10, and also illustrates two exemplary, alternate paths for processing the casing and other portions of the energy storage device once the electrolyte has been removed—one for battery refurbishing/rejuvenation, and one for battery pulverization and recycling. Method 30 is described in the context of a lithium battery, but it will be appreciated that the method may be applied to any other suitable energy conversion and storage device, such as a lithium-containing capacitor, super capacitor, ultra capacitor, pseudo-capacitor, or even some suitable fuel cells.

Method 30 includes first collecting and discharging one or more lithium batteries at 32, and then sorting the batteries at 34, to identify possible candidates for refurbishment. Typically, the lithium batteries (or other lithium-containing wastes) are collected in relatively large quantities for batch extraction processes. In the event that some of the batteries may have leaks, the initial collection may be performed in a dry, cool, well-ventilated area fitted with non-aqueous fire-suppression equipment at hand. Although leaky cells are unlikely, fire may potentially result when lithium is exposed to an oxidizing agent such as air or water.

The lithium batteries collected for electrolyte extraction may have any suitable electrolyte. As described above, typical electrolytes used in lithium-containing batteries are composed of a lithium salt or salts dissolved in an alkyl carbonate solvent or solvent mixture. Examples of lithium salts include, but are not limited to, $LiPF_6$, $LiAsF_6$, $LiBF_4$, $LiClO_4$, lithium pentafluorothiodifluoromethanesulfonate, LiBETI (lithium bis perfluoroethanesulfonimide), LiTFSI (lithium bis(trifluoromethylsulfonyl)imide), LiTf (lithium trifluoromethanesulfonate), and LiTFSM (lithium trifluoromethanesulfonylmethide), dissolved in ethylene carbonate and diethyl carbonate (1.2 M $LiPF_6$ in 1:1 EC:DEC). Examples of solvents for the lithium salt include, but are not limited to, dimethoxyethane (DME), dimethyl carbonate (DMC), diethyl carbonate (DEC), dipropyl carbonate (DPC), dioxolane, ethyl methyl carbonate, ethylene carbonate, and propylene carbonate. Other compounds that may also be present in the electrolyte, such as thionyl chloride and iodine (sometimes found in primary lithium batteries), may also be extracted via method 30.

The lithium batteries may be sorted based on any suitable characteristics. For example, the batteries may be sorted as a function of manufacturer and battery chemistry. Where battery chemistry is used as a sorting criterion, any rechargeable battery that does not exhibit structural damage or a short circuit may be classified as a candidate to be refurbished instead of broken down into its constituent parts. It will be appreciated that, in the sorting process, the measured impedance level of a battery may vary as a function of battery size, measurement temperature, chemistry and manufacturer. Thus, cut-off values for refurbishment of the battery v. pulverization of the battery may be determined on a case-by-case basis.

After sorting is complete, any labels may be removed from the battery casings. Also, any dirt, moisture, oils, etc. may be removed via an appropriate cleaning routine, for example, via an alcohol (isopropanol, isobutanol) rinse. The de-labeling and cleaning processes leave only the packaging material (typically a steel case) and inner contents of the battery behind. Furthermore, any over-discharge and/or over-charging protection circuitry may be removed from the battery. Where this circuitry is configured to be removable and reattachable, the circuitry may be reattached to a refurbished battery after completing processing.

After the batteries have been sorted, they are sealed in a high pressure treatment container at 36, which is then filled, at 38, with a suitable fluid. Many fluids may be suitable for use in the treatment methods disclosed herein. Suitable fluids include those that are a gas at ambient temperature so that recovery of the dissolved electrolyte does not require a large input of energy. Other desirable characteristics of the fluid include, but are not limited to, low toxicity, low cost, high solubility for the electrolyte. Suitable fluids may also be aprotic (to avoid hydrogen gas formation when converting lithium metal to lithium carbonate) and anhydrous. As described above, $CO_2$ possesses many properties that make it a particularly good fluid for extracting the electrolytes. Besides $CO_2$, examples of other suitable fluids include, but are not limited to $N_2$, $O_2$, $H_2$, Ar, He, Ne, freon, dimethylether, $BF_3$, $PCl_5$, $NH_3$, $SF_6$, $Cl_2$, $F_2$, $NH_3$, $NR_3$ (R=methyl, ethyl propyl, butyl), $N_2O$, and dimethyl ether. Furthermore, fluids such as $Br_2$ and $CS_2$ that are liquid at ambient temperature, or even $I_2$, which is solid at room temperature, may potentially be used to dissolve electrolytes, but they may require energy input to distill the material to precipitate, or otherwise recover, the electrolyte for recovery. In FIG. 2, the $CO_2$ container for the addition of $CO_2$ is indicated at 40.

Before filling the treatment container with the fluid, one or more purge cycles of the fluid may be run through the treatment container to remove any moisture or other contaminants.

Various additives may be added to the fluid to enhance its performance in the electrolyte extraction process. For example, solubility enhancers may be added to improve the solubility of the electrolyte in the fluid. Examples of suitable solubility enhancers for enhancing the solubility of lithium salts in supercritical $CO_2$ include, but are not limited to, alkyl ethers with the general formula $OR_2$ (R=methyl, ethyl, propyl, butyl); oligoethers selected from the group consisting of glyme, d-glyme, tri-glyme, tetra-glyme, and ethylene-glycol alkyl ethers; nitrobenzene; acetonitrile; alcohols with the general formula ROH (R=methyl, ethyl, propyl, butyl); allyl alcohols; unsaturated alcohols; $CS_2$; alkyl halide compounds with the general formula $CH_xCl_{4-x}$; and dimethylsulfoxide.

The fluid may also contain a Lewis base as an additive. This is because electrolytes containing $LiPF_6$, $LiBF_4$ or $LiAsF_6$ may pose some unique reactivity problems. When heated, $LiPF_6$ generates LiF and the Lewis acid $PF_5$ in the following equilibrium:

$$LiPF_{6(diss)} \leftrightharpoons LiF_{(s)} + PF_{5(g)} \qquad (6)$$

$LiBF_4$ and $LiAsF_6$ generate $BF_4$ and $AsF_5$, respectively, via a si  If the solubility for LiF is low, it may precipitate and thus may help drive the equilibrium to the right. The Lewis acid produced may react with other battery components, and also may potentially produce HF if small quantities of water are available. Equilibrium (6) may be kept to the left side by maintaining a high pressure, such as in the supercritical extraction process described herein, and operational temperatures below 60° C. It is unlikely that Lewis acids would be generated in the supercritical extraction process described herein, but a Lewis base may be added to the fluid to react with any Lewis acids on the chance that they may be produced. Examples of suitable Lewis bases for use in the fluid include, but are not limited to, ammonia, amines with the general formula $NH_xR_{3-x}$ (R=methyl, ethyl, propyl, butyl), pyridine, polymeric bases such as polyethylene imine and polypyridine, base-functionalized polymers, and block-copolymers containing basic moieties.

Furthermore, a lithium-containing moiety may be added to the fluid to add additional lithium to the battery, thereby potentially further help restore battery capacity. Any suitable lithium-containing moiety may be added, including but not limited to lithium-containing solutes, co-solvents and other mixtures.

After adding the fluid, the pressure and temperature of the fluid are increased at 39 until conditions exceed the critical point for the fluid (31.1 degrees Celsius, 1075 psi/73 atm for $CO_2$). Where $CO_2$ is used as the fluid, the pressure in the treatment container may be increased by pumping liquid $CO_2$ into the treatment container. As the pressure increases (typically beginning around 5 atm/75 psi), the battery casings are breached, and the interiors become permeated with liquid $CO_2$. Audible cracking of the cell was detected at 800 psi, indicating that the cells were breached well below the critical pressure of the $CO_2$. Supercritical $CO_2$ has a very low surface tension, allowing it to contact and imbibe sub-micron sized pores. Thus, there is no need to increase the surface area of the material by grinding or milling prior to adding $CO_2$.

Breaching the walls of the battery casings may occur as quickly as within the first few minutes of the pressurization. Reactions within the cell may begin to occur immediately after the casings are breached. Liquid $CO_2$ (from a standard $CO_2$ gas cylinder) typically enters the treatment container at a temperature between −56 and 20 degrees Celsius. The low temperature may be advantageous, as it may cause the conversion of lithium metal to lithium carbonate to occur at a relatively slow rate. Where recycled $CO_2$ is used, it may be desirable to cool the $CO_2$ prior to introducing it into the treatment container to slow the reaction between the lithium and $CO_2$. Alternatively, the $CO_2$ may be added to the treatment container in either solid or supercritical form. Where the $CO_2$ is added to the treatment container in solid form, enough $CO_2$ should be added so that the pressure exceeds the critical pressure when the solid $CO_2$ has completely changed phase.

At this point, any disconnected lithium metal or reduced carbon ($Li_xC_6$) reacts with carbon dioxide to produce CO and $Li_2CO_3$.

$$Li + 2CO_2 \rightarrow Li_2CO_3 + CO \quad (7)$$

At these low temperatures (−56-20 degrees Celsius) the reaction proceeds slowly. A small quantity (4%) of dry air or oxygen may be added during the reaction period to avoid the production of CO.

$$Li + \tfrac{1}{2}O_2 + CO_2 \rightarrow Li_2CO_3 \quad (8)$$

To assist reaction completion, the temperature is gradually increased to 31 degrees Celsius, and the pressure increased to 2000 psi (over a time period of 30 min). Once the fluid has reached a supercritical phase, the pressure helps to ensure that the $CO_2$ is able to react with the largest part of the lithium metal or reduced carbon. The temperature may be increased to a temperature over 31 degrees Celsius if desired, up to and even over 60 degrees Celsius. The progress and control of the conversion of metallic lithium to lithium carbonate may be monitored by measuring and limiting the concentration of air added to the mixture. Alternatively, the $CO_2$ may be used in pure form, and any CO produced in the conversion may be removed in the $CO_2$ recycling stage. The use of other common lithium scavengers such as water or isobutyl alcohol may not be advisable, as these compounds may cause the production of hydrogen gas and LiOH as described above.

It will be appreciated that the battery casings may also be breached before being added to the extraction treatment container. Under this scheme, the battery casings may be breached by any suitable method. Examples of suitable methods include, but are not limited to, mechanical drilling, piercing, laser drilling, and milling.

Some batteries (or other power storage and/or conversion devices) may include a pressure relief valve built in to the battery casing. Where this valve is present, the valve may fail and be breached before the cell walls are cracked. Likewise, a battery casing may be designed that has a valve designed for the express purpose of failing during the pressurization step of the treatment process so that each battery casing fails in a predictable location. Such a valve may allow the addition of a new volume of electrolyte in the refurbishing process to be automated, as the point of failure (and thus the point at which the new volume of electrolyte may be added to the casing) may be the same for each battery. The same valve could function as an emergency pressure relief valve as well, failing outwardly when gas pressure builds up in the battery during use, and failing inwardly during removal of electrolyte and treatment of electrodes. The pressures at which each failure takes place may be tailored via the mechanical design of the valve latching mechanism.

Additionally, a battery could be fitted with a resealable opening that allows the battery to be opened for refurbishment, and then resealed once refurbishment has been completed. When rejuvenation and/or recycling is to occur, the cell may be opened, the electrolyte removed via centrifugation or pressurized displacement and the interior of the cell rinsed for rejuvenation and recycling purposes. One example of a potentially resealable battery is similar to that disclosed in U.S. Pat. No. 6,080,508, to Dasgupta et al., which describes a multilayered laminated enclosure for a lithium-ion battery, and which is hereby incorporated by reference. Such a packaging system may have cost, processing and weight advantages over hermetically sealing the battery stack inside a metal can. Such a cell may be easily opened, the electrode laminate removed, the cell rejuvenated and then repackaged using another laminated enclosure, and then the battery replaced into its appliance.

An alternate design for a resealable battery may utilize a screw-top closure. For example, a cathode/anode stack may be placed inside a hard-walled package fitted with a screw-top system to close the battery. To rejuvenate the battery, the screw-top could be removed from the top and/or bottom, the system placed into a processor (even by screw-fitting the battery into the processing system), the assembly rejuvenated and then removed from the processing system, the caps replaced, and the battery replaced into its appliance.

Yet another design for a resealable battery may utilize a cell designed to be hermetically sealed with a removable cap. For example, a cathode/anode stack may be placed inside a hard-walled package fitted with a lip or flange configured to accept attachment of a cap of lid to make a hermetic seal (with or without the use of an additional sealant). To access the inside of the battery, the cap may be removed (thereby breaking the hermetic seal). After processing, a new cap may be applied to the top and/or bottom of the battery, a new hermetic seal may be made, and the battery may be replaced back into its appliance.

Figure 6A:
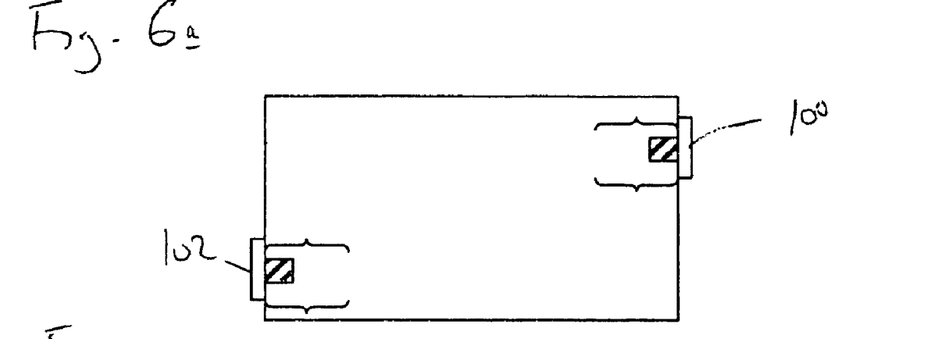
FIG. 6a is a schematic depiction of an embodiment of a battery having resealable valves for facilitating a refurbishing process, with the valves in a closed, sealed configuration.
Figure 6B:
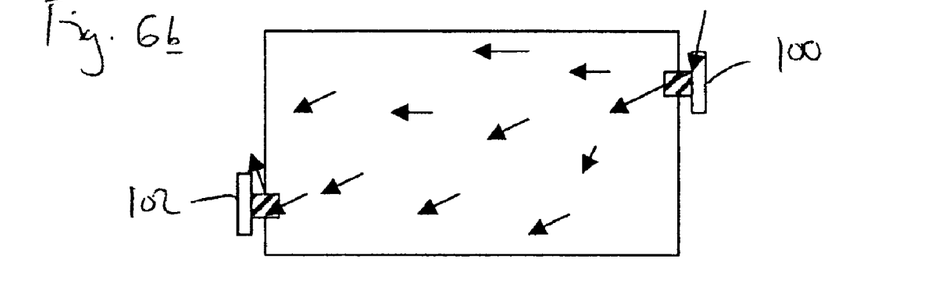
FIG. 6b is a schematic depiction of the embodiment of FIG. 6a, with the valves in an open, unsealed configuration.

A further design for a resealable battery may utilize threaded valve closures or the like which could be unscrewed before processing to allow the supercritical fluid to access the interior of the battery, and which could then be screwed shut after processing is complete. FIGS. 6a and 6b show such an exemplary embodiment of a cell having two such valves, indicated at 100 and 102. FIG. 6a shows valves 100 and 102 in closed positions, and FIG. 6b shows valves 100 and 102 in open configurations. Arrows in FIG. 6b indicate a potential, exemplary path of supercritical fluid flow through the cell.

Figure 7A:
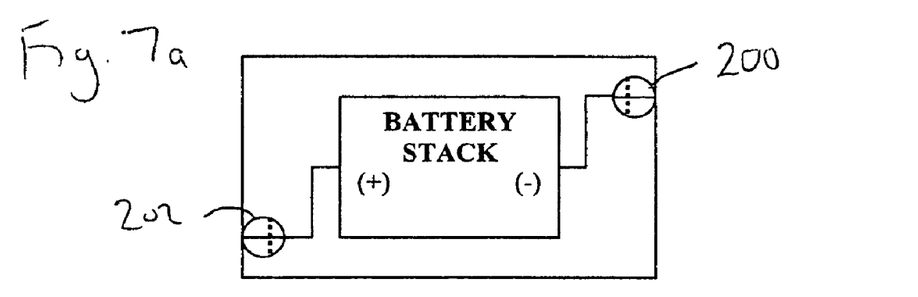
FIG. 7a is a schematic depiction of another embodiment of a battery having resealable valves for facilitating a refurbishing process, with the valves in a closed, sealed configuration.
Figure 7B:
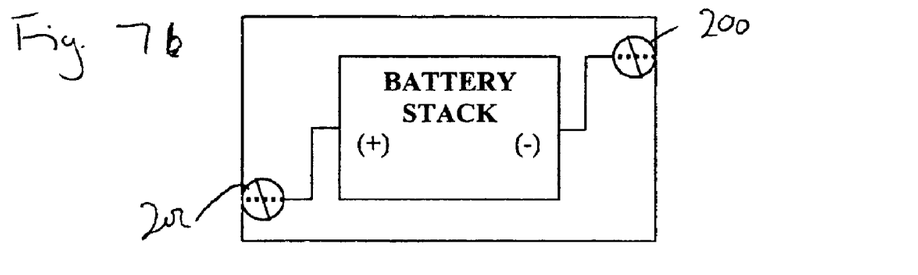
FIG. 7b is a schematic depiction of the embodiment of FIG. 7a, with the valves in an open, unsealed configuration.

Yet another design for a resealable battery may utilize a stopcock valve. For example, a cathode/anode stack may be housed in a hard-walled container or a multilayered laminated container that is fitted with a stopcock that may open to allow rejuvenation treatment and closed when the battery is ready for use. Such a valve may be fitted such that in the open position, the electrical contact between the cathode/anode stack and the outer cell is broken, whereas in the closed position, the connection would be complete. FIGS. 7a and 7b show such an exemplary cell having two such valves, indicated at 200 and 202. In these Figures, the dashed lines in the valves indicate fluid flow paths, and the solid lines indicate electrical current flow paths. Therefore, in FIG. 7a, the configuration of valves 200 and 202 permit electrical current but not fluid to flow, whereas in FIG. 7b, the configuration of valves 200 and 202 permit fluid but not electrical current to flow. This may allow a way to electrically isolate the stack from the outside world, reducing the risk of short-circuit. For any of these resealable battery configurations, the openable/resealable mechanism may be fit with a key so that only authorized, trained personnel may access the interior of the cell.

After the temperature and pressure are increased to the appropriate levels, electrolyte removal and electrode treatment commences at 42. The treatment may either be dynamic, in which $CO_2$ is constantly pumped through the system, or static, in which the batteries soak in a fixed amount of $CO_2$ for a period of time. During the treatment process, electrode contaminants dissolve in the supercritical $CO_2$. Where a dynamic extraction is used, the supercritical fluid is pumped through the treatment container and removes electrolyte and cleans contaminants from electrode-electrolyte interfaces as it flows through the opened batteries. Where a static extraction is used, the supercritical fluid may be transported to a recovery container after a desired amount of time has passed.

Solubility of the electrolyte solvent, salts and/or the oligo-ether and oligocarbonate waste products may be controlled through the supercritical pressure, temperature and the use of the additives described above. Once the electrolyte, salts and/or waste products are dissolved, they moves in solution with supercritical CO2 to a precipitation vessel, as indicated at 44 in FIG. 2. Releasing $CO_2$ gas in the precipitation vessel reduces the pressure and precipitates any dissolved electrolyte solvents and salts, and also the dissolved oligocarbonates, oligoethers and other waste products from the electrode-electrolyte interfaces. The process continues until achieving quantitative extraction removal of the electrolyte components and waste products. As described above, the $CO_2$ may then be used for another extraction. Data from an example extraction are shown in Table 1 below.

TABLE I

Weight percent of components removed after treatment

| Component | 25° C./ 2000 psi | 50° C./4100 psi | Time/min |
|---|---|---|---|
| Ethylene Carbonate (EC)/Diethyl Carbonate (DEC) (1:1) | 71% | 76% | 10 |
| $LiPF_6$ | 0 | 0 | 120 |
| EC/DEC/$LiPF_6$ (11% by weight $LiPF_6$) | | 92% | 120 |

After the electrolyte is removed, the remaining components include the casing, cathode, anode, $Li_2CO_3$ and separator in a dry, non-flammable, minimally reactive form. They are thus essentially battery-shells, without the electrolyte and the reactive lithium.

At this point, the shells from each batch that were determined at step 34 to be suitable for refurbishing may be again sorted at 46 to determine if any of the batteries were short-circuited or otherwise damaged by the treatment process sufficiently to render the batteries unsuitable for refurbishing. Those which were damaged may be safely shredded and separated into their pure and dry components through sifting and density separation methods. The shells to be refurbished may simply be refilled with electrolyte and recharged to operate as a functioning lithium-ion battery.

An exemplary refurbishing process is indicated generally at 50 in FIG. 2, and an exemplary pulverization/recycling process is indicated generally at 60. First referring to refurbishing process 50, the process is typically performed only on battery shells determined at 52 to have potential to function as a battery. Once these batteries are identified (via impedance measurements or other suitable methods), they are prepared for refurbishing in a dry, moisture free environment. The batteries can be refurbished under the assumption that the cathode, anode and separator are functional. Processing in the supercritical fluid removes oligo-carbonates and ethers that have accumulated throughout the battery and degraded its performance.

Next, the battery is refilled with electrolyte at 54 to produce a discharged cell. Finally, the battery is sealed, and is ready for recharging to create functional batteries at 56.

Batteries that do not recharge or cannot charge and discharge to their full capability, as indicated at 62 in FIG. 2, may instead be subjected to recycling process 60. For example, a Panasonic CGR18650 lithium-ion battery has a 1,500 mAh capacity. If the capacity of the refurbished battery is not at an acceptable level for example, 80% of the original capacity, it is recycled. Batteries that were identified for recycling are pulverized and sorted into their components at 64. Any suitable pulverization process may be used, for example, ball milling, shredding, hammer milling or cutting. The pulverization may be performed in the absence of water and oxygen to avoid contamination of the materials.

If desired, after pulverization of the device, the remaining electrode materials may be delaminated from their current collectors through solvent and agitation. Some effective solvents include, but are not limited to tetrahydrofuran/acetone, dimethylformamide, water, or supercritical $CO_2$. The action of a solvent along with ultrasonic agitation easily removes the bound powders from the current collectors. The powder mixture is then filtered from the large particles through a mesh, or may be recovered in any other suitable fashion.

Following the milling and filtering process, the solid materials may be sorted at 66 into metal oxides such as lithium cobalt oxide, lithium cobalt nickel oxide and lithium manganese oxides, polypropylene, $Li_2CO_3$, metals such as copper and aluminum foil, and graphitic carbon. The particular compounds will vary with the battery chemistry or nature of the lithium-containing waste. All of these components may be reusable for many applications, including new lithium batteries.

Multiple methods exist to separate these components. The materials differ in electronic conductivity, so they may be separated using an electrostatic method in which the dry powder mixture is exposed to a capacitor plate, those materials which develop a surface charge may be lifted and electrostatically attached to the plate. Also, the materials differ in density, and therefore may be separated using a cyclone, fluidized bed, or through solution dispersion coupled with decantation and filtration.

The graphitic carbons from used lithium batteries and recycled using supercritical $CO_2$ have the potential to be more valuable as an anode than the similar parent material that went into the original battery. These carbons have undergone lithium intercalation and have not been reintroduced to air or water in the recycling treatment program. Therefore, they have established pathways for lithium ion movement and their surfaces have been stripped of reactive functional groups. In addition to the value of the salts, solvents and oxides, this process should produce high value amorphous carbons useful for lithium battery anodes.

It will be appreciated that the processes shown and described above in FIGS. 1 and 2 are exemplary, and that other variations are possible and within the scope of the present disclosure. For example, the electrolyte and electrolyte salts may be removed from the cell via a centrifuge process before exposing the cell interiors to supercritical fluid.

Figure 3:
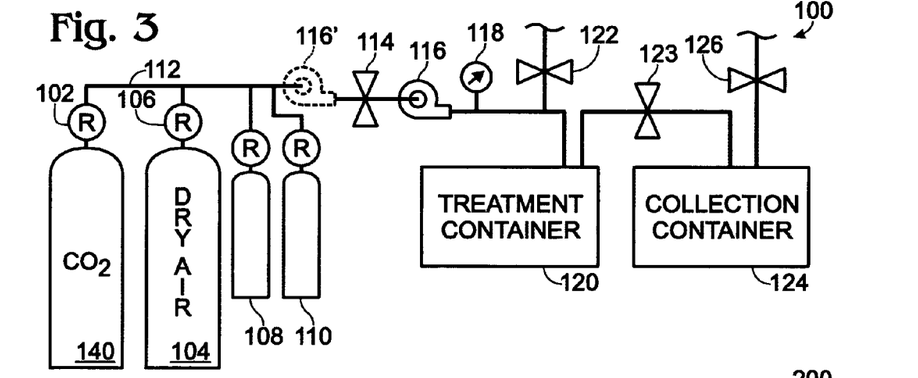
FIG. 3 is a schematic diagram of a first exemplary system for processing an end-of-life or reduced performance energy storage and/or conversion device.

The use of the methods described herein to extract electrolyte from lithium-containing power storage and/or conversion devices offers the additional advantage of being simple to implement. FIG. 3 shows generally at 100 an exemplary embodiment of a first reaction system suitable for use with methods 10 and 30. System 100 includes a $CO_2$ tank 140 (corresponding to $CO_2$ tank 40 of FIG. 2) for introducing $CO_2$ into an treatment container 120. A regulator 102 controls the pressure of the $CO_2$ introduced into a manifold 114 positioned fluidically upstream of extraction vessel 120. Other fluid tanks may be provided for introducing various additives into the system. For example, a dry air tank 104 may be provided for adding dry air to prevent the formation of CO in the lithium carbonate production process as described above. The dry air tank typically is attached to a regulator 106 to allow control of the partial pressure of oxygen in manifold 114. Also, a Lewis base tank 108 may be provided for adding a Lewis base to the system to react with any Lewis acids formed by the heating of lithium salts during the extraction process. Furthermore, a tank containing a solubility enhancer 110 may be provided for adding small amounts of a solubility enhancer as described above in reference to FIGS. 1 and 2. While system 100 is described in the context of a $CO_2$ system, it will be appreciated that any of the other fluids described above may be used in place of, or in conjunction with, the $CO_2$ where the solubility of a particular electrolyte salt or solvent is compatible with the other fluid or fluids.

Fluid flow from manifold 112 to treatment container 120 is controlled by an inlet valve 114. The use of a single valve to control fluid flow into treatment container 120 ensures that the fluids are well-mixed upon entering the treatment container. However, it will be appreciated that the fluids may also be introduced into treatment container 120 via separate manifolds and valves if desired. Furthermore, a pump 116 may be used to push fluids through treatment container 120 at a constant rate. Due to the high pressures used in extraction vessel 120, pump 116 should be a high-pressure pump, rated to 3000 psi or greater. Pump 116 may be positioned either downstream of inlet valve 114, as indicated in solid lines, or upstream of inlet valve 114, as indicated in dashed lines at 116'. A pressure gauge 118 allows pressure within extraction vessel 120 to be continuously monitored. It will be understood that manifold 112, or any other suitable part of system 120, may also have a pressure gauge if desired.

Treatment container 120 is configured to accept insertion of a sample or batch of energy storage and/or conversion devices, and to form an airtight seal to prevent moisture from entering the container. Treatment container 120 may include a heating element to allow the container to achieve the elevated temperatures necessary to form a supercritical phase. Because system 100 is a continuous flow system, supercritical fluid flows continuously through treatment container 120 and collection container 124. Collection container 124 is configured to allow the supercritical fluid to cool and expand, thus precipitating electrolyte solvents and salts, and any other materials recovered from the batteries into the collection container. A bleed valve 122 may be included to help prevent buildups of pressure in the system, and a valve 123 may be placed between treatment container 120 and collection container 124 if desired.

Figure 4:
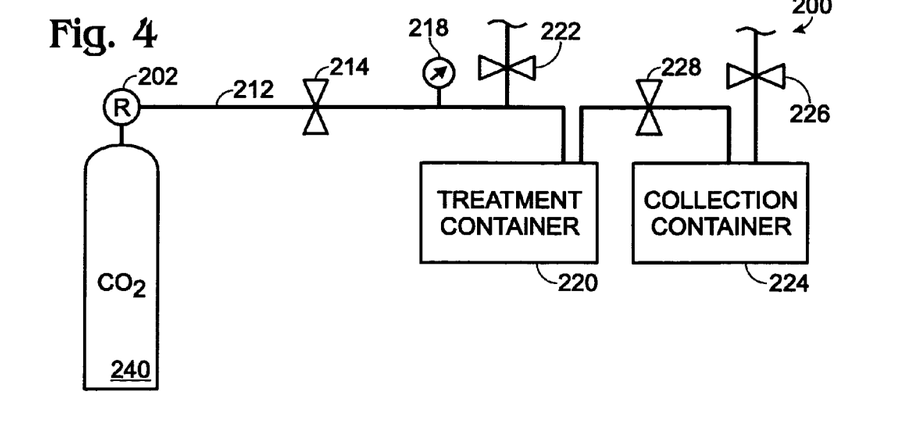
FIG. 4 is a schematic diagram of a second exemplary system for processing an end-of-life or reduced performance energy storage and/or conversion device.

FIG. 4 shows, generally at 200, another exemplary embodiment of a reaction system suitable for use with methods 10 and 30. Reaction system 200 is similar to reaction system 100 in many respects, as it includes a $CO_2$ tank connected to a manifold 212 by a regulator 202. Manifold 212 is fluidically connected to treatment container 220 by an inlet valve 214, and pressure in extraction vessel 220 is monitored by a pressure gauge 218.

However, unlike system 100, system 200 is not a continuous-flow system, but rather is configured to be a static system. A desired pressure of supercritical $CO_2$ may be introduced into treatment container 220 from manifold 212, and then the inlet valve and a treatment container outlet valve 228 may be closed for a duration of time to let the $CO_2$ penetrate the batteries. Once the period of time has passed, treatment container outlet valve 228 may be opened to expand the supercritical fluid into collection container 224 and out of outlet valve 226 to precipitate the recovered electrolyte salts and solvents in the collection container.

A battery configured to be periodically refurbished or rejuvenated may also include a mechanism configured to time or otherwise detect when the battery needs refurbishing. Any suitable method may be used to time, detect or otherwise determine when refurbishing should take place. Examples include, but are not limited to, mechanisms or methods sensitive to time, temperature, number of charge-discharge cycles, and/or the internal resistance of the cell.

In one specific embodiment, a temperature-sensitive mechanism for detecting when refurbishment may be needed may utilize a calorimetric notification system sensitive to heating that may occur from internal resistance or external sources. In another specific embodiment, a time-sensitive mechanism for detecting a potential need for refurbishing may utilize a device based upon ionic diffusion which realizes a calorimetric change. This may be accomplished by joining two gel-strips, as one diffuses into another a color change results; for example in the reaction $Co^{2+}_{(dry)}$+amine->Co(amine)$^{2+}$, a blue color results after the amine (or cobalt) diffuses through a layer and combines to produce the complex. The diffusion time is related to the thickness and conductivity of the substrate. In yet another specific embodiment, a counter circuit (either separate from or integrated with overcharge and overdischarge-protection circuitry) may be used to count a number of charge/discharge cycles which the battery has undergone. In still another specific embodiment, a circuit that measures the internal impedance of the cell and compares the internal impedance to a preselected "rejuvenation threshold" impedance may be used to detect when the measured impedance surpasses the threshold, and to alert a user of the cell when this threshold has been surpassed.

As described above, the overcharge and overdischarge protection circuitry that is often utilized with batteries may potentially be re-used with a refurbished, or even a new, battery cell. However, current overcharge and overdischarge protection circuitry is typically soldered or otherwise permanently attached to the battery packaging so that removing the circuitry may damage the circuitry. To overcome such problems, a battery package may be designed such that the overcharge and overdischarge protection circuitry is removably attached to the battery pack such that it can be removed for refurbishing/rejuvenation, and then reattached afterwards (or reused in new batteries). Any suitable method and/or mechanism may be used to removably attach the overcharge and overdischarge circuitry to a battery package or casing. Suitable methods include those that ensure the leads of the overcharge and overdischarge protection circuitry are securely in contact with the battery terminals. Examples include, but are not limited to, spring-loaded contacts that contact the positive and negative terminals of the cell, snap attachments to the positive and negative terminals, a frictional contact such as a dovetail or lock-and-key design, and/or attachment via a screw-type fastener.

Various improvements may be made to the casing of a battery (or other energy storage and/or conversion device) to facilitate performing the rejuvenation and/or recycling processes disclosed herein on the battery. Typically, battery casings are made of a high-impact material (such as a plastic or metal material) and are irreversibly sealed through thermal or mechanical methods. However, such packages may be difficult to open for recycling and/or rejuvenation. To facilitate recycling, the battery package may contain a seam that may be opened via a special tool so that the package may be opened without damaging the contents, yet that is not easily openable accidentally by a consumer. Likewise, as described above, a package for a refurbishable battery may have an opening configured to be openable only by certified and trained personnel.

Different batteries may have different optimal refurbishment and/or recycling conditions. Therefore, it may be desirable to include a barcode (or like identification device) that includes information about the chemistry, size and positions of the components within the battery. Such information may allow an automated process to distinguish between different cells, even where the cells have similar sizes, packaging, etc. For cells deemed to be recycled, the information could further be used to program steps for automated destruction of the package and total materials recovery of the cells and circuitry.

The market for portable power devices has expanded greatly in recent years. Lithium-ion rechargeable batteries have transformed heavy, low performance appliances into light-weight, high performance appliances. However, a barrier for lithium-ion rechargeable battery entrance into many applications is the cost of purchasing new batteries when the performance of older batteries degrades to unacceptable levels. The rejuvenation/refurbishing processes described herein therefore solve an economic problem: through rejuvenation, a battery does not need to be replaced and the high costs associated with replacement are avoided.

A rejuvenatable, rechargeable lithium-ion battery as disclosed herein may be used to operate equipment such as high-performance hybrid electric vehicles or fully electric vehicles made for use on highways and roads, and low-performance hybrid electric or fully electric vehicles made for use in isolated areas such as a large public or business property. Such batteries can also be designed for electric bicycles, pedal assist bicycles, fully electric wheel chairs, motion assist wheel chairs, fully electric scooters, motion assist scooters, and other such people movers (i.e. SEGWAY Human Transporters). When the performance of such a battery degrades to an unacceptable level, or when a timing or counting circuit indicates that refurbishment is needed, the battery may simply be refurbished/rejuvenated as described above, and then put back into use in the vehicle.

A rejuvenatable, rechargeable lithium-ion battery as disclosed herein may also be designed for use in voice and data communications applications. These include but are not limited to mobile telephones, cellular telephones, portable radios, reserve power for fixed telephony, and reserve power for mobile telephone network towers. Mobile computers require lightweight, high power rechargeable batteries and could utilize a rejuvenatable, rechargeable lithium-ion battery.

A rejuvenatable, rechargeable lithium-ion battery as disclosed herein furthermore may be designed for use in video and audio applications. These include but are not limited to portable video cameras, digital cameras, audio recording devices, musical instruments with amplification, portable audio devices, and portable video devices, such as handheld video games.

EXPERIMENTAL RESULTS

Capacity faded prismatic cells were treated with the above-disclosed refurbishment process. The capacity was restored to nearly 1000 mAh for each cell, which is within 85% of the (assumed) original manufactured capacity of 1200 mAh. In the process, cells were removed from their packaging, discharged completely, a hole was bored into the bottom, and the electrolyte was removed using a centrifuge. The cells were then were pulsed and soaked for 20 minutes in 45° C. supercritical $CO_2$. New electrolyte was next introduced using a vacuum-back-fill, and the cells were and sealed with epoxy and a small aluminum scrap. The process for remanufacturing a discharged cell requires 45 minutes. This time could be substantially reduced via the use of a cell having a resealable opening to facilitate refurbishment. The cells were style 3310/339 BANK 3390LI 08262002 3.6 V Li-ion batteries.

Capacity Assessment

Cells were charged to 4.25 V using a constant current (100-300 mA). The time, voltage and current were recorded periodically and used to calculate the charge capacity. Charge capacity is the current passed during a time period and is reported in units of milliampere hours (mAh). After disconnecting the current, the open circuit potential was recorded, and the cell was allowed to rest for 10 min. Cells were then discharged through a 10 Ohm resistor. The voltage, current and time were recorded every 5 to 20 min until the cell dropped below 2V. The current decreases with time as the cell discharges and a constant current cannot be used to calculate capacity; therefore, the average current for a given time period was used to calculate a differential capacity. The cell capacity is the sum of each differential capacity until the voltage drops to 2V. Cells were rested and discharged repeatedly.

Electrolyte Removal

After complete discharge, the electrolyte was removed through a hole bored into the top of the cylindrical cells or through the bottom of the prismatic cells. A centrifuge was used at 2000 rpm for 5 min to aid in removal of the electrolyte. Electrolyte was collected in a glass jar placed below the cell in the centrifuge. These manipulations were accomplished in air. Opened cells remained in air for approximately 10 min.

Treatment

Cells were placed inside a 100 mL high-pressure extraction vessel. The vessel was sealed, placed into a water bath at 45° C. and filled with $CO_2$ at room temperature. Within 3 min, the pressure increased to 6000 psi and the vessel was allowed to soak for 10 min in supercritical $CO_2$. After soaking, the pressure was reduced to 4000 psi and stopped; the internal pressure increased to 4500 psi after 15 seconds. The pressure was stepwise reduced four times in this fashion to 1000 psi. Afterwards, the extractor was refilled with $CO_2$ to a pressure of 2000 psi and pulsed and refilled a total of three times (2000-14 psi). Afterwards the cell was removed and placed in the $CO_2$ filled glove box.

TABLE II

Summary of Treatment Parameters

| Type of Pulse | Max Pressure T = 45° C. | Number of Pulses | Time period | Frequency Pulses/min |
|---|---|---|---|---|
| Supercritical—Supercritical | 6000 psi | 2 | 1 min | 2 |
| Supercritical–Subcritical | 2000 psi | 6 | 1:30 | 4 |

Refill

Cylindrical cells were placed inside a test tube filled with enough electrolyte (Lithchem Elyte, 1 M EC-DEC 30/70) to cover the top of the cell. The test tube was capped and a vacuum was applied through a pasture pipette to a small hole on the test tube cap. Electrolyte was observed to enter the cell, when gas-bubbles ceased to appear from the hole in the cell, the process was stopped and the cell was removed.

Sealing

Cells were sealed by application of fast-setting epoxy and a small piece of aluminum over the hole. Alternatively, cells were sealed by a screw fitted to the bore-hole. The sealing process exposed the open cells to air for approximately 5 min.

The capacity of the remanufactured cell was measured using an identical charge-discharge method described above. The laboratory temperature was recorded at the time of discharge.

Results

Figure 5:
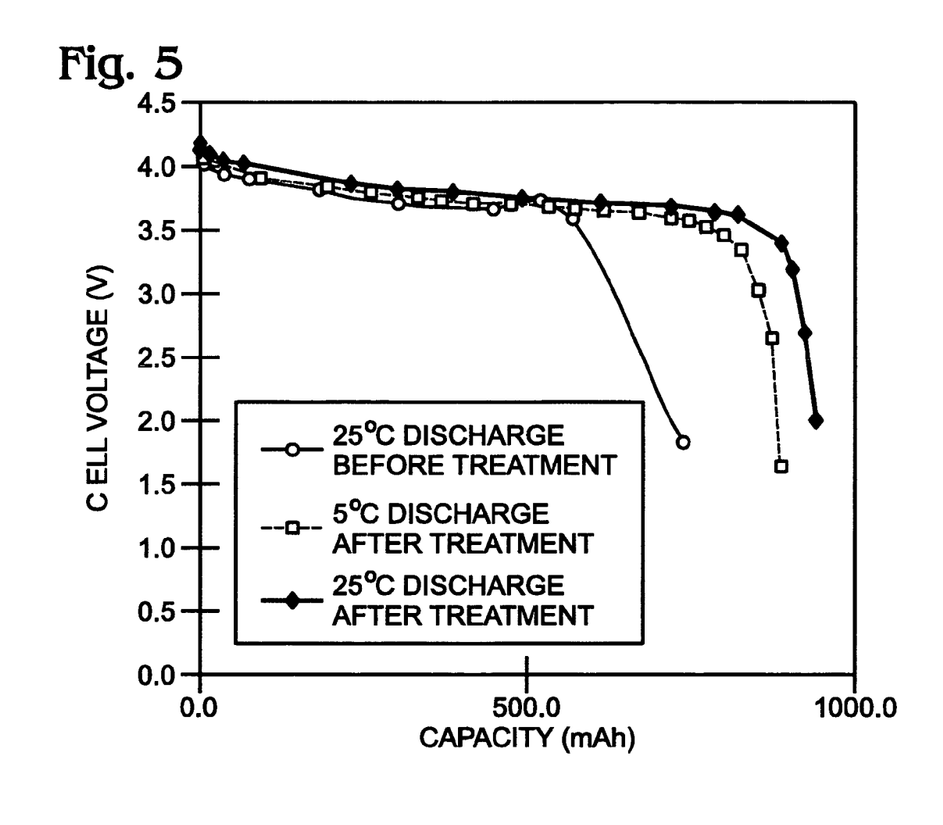
FIG. 5 is a graph showing experimentally determined cell voltages vs. cell capacities for a battery before and after refurbishment.

The prismatic cells show a substantial capacity improvement after treatment with supercritical $CO_2$ and replacement of the electrolyte. Table III below summarizes the changes in capacity and resistance for the cells, and FIG. 5 shows a graph of experimentally determined cell voltages vs. cell capacities before and after refurbishment.

TABLE III

Observations from pre- and post-treated cells

| Cell | Cap/ mAh (pre) | | Cap/ mAh (post) | | % increase in Cap. | % of 1200 mAh |
|---|---|---|---|---|---|---|
| 132 | 737 | 25° C. | 942 | 25° C. | 27.8 | 79% |
| 134 | 963 | 25° C. | 1036 | 5° C. | 7.6 | 86% |

The capacity of prismatic cells 132 and 134 increased 27.8 and 7.6% respectively. Cell 134 had a pre-treatment capacity of 963 mAh; if the original capacity of the cells is taken to be 1200 mAh its pretreatment capacity is 19.7% of normal. The electrolyte removed from this cell was clear, indicating very little wear. It is likely this cell did not see very much use in its lifetime and was like-new when returned to the retail center for recycling. The laboratory temperature was 5° C. when the post treatment capacity was measured. At room temperature, the capacity may be expected to increase by another 6-10% (see FIG. 4) which places the remanufactured capacity within 95% of original.

The prismatic cells are identically manufactured products; it appears the only difference between them upon collection was the level of wear. The fade in cell 132 was 61% of the (assumed) 1200 mAh original capacity. Wear was evident in the brown colored electrolyte. Cell 132 has more room to make improvement in capacity over cell 134 because it starts with a lower pre-treatment capacity.

Both cells were processed simultaneously in supercritical fluid. The gain for each cell reaches about 1000 mAh in post-treatment capacity. A fully developed supercritical fluid treatment regimen would have produced cells with capacity equivalent to the original 1200 mAh level. Subsequent treatments of the cells should help define the required treatment time to achieve full recovery of capacity.

The IR drop improved for each cell upon remanufacturing. As the current switched off during charge, the voltage dropped from 4.25 to 4.20; after remanufacturing this drop was from 4.25 to 4.22. The smaller IR drop indicates less resistance due to surface films.

The increase in capacity may be due to removal or disturbance of the waste products or residues built up during the life of the cell. As described above, electrolyte decomposition produces oligoether-carbonates which may precipitate in the separator and on electrodes surfaces. The plaque increases the internal resistance of the cell, making charge and discharge more difficult. Since the electrodes are in good condition, plaque removal results in a refurbished cell. Supercritical $CO_2$ is a very good solvent for carbonate containing moieties. Therefore, without wishing to be bound by theory, it is likely that supercritical $CO_2$ removes or disturbs oligo-ether-carbonates during treatment. Some of the oligomers may be charged and more difficult to remove in a short treatment time in supercritical $CO_2$. Increased treatment times may quantitatively remove these moieties and return the cells to their original capacity. It will be appreciated that some small quantity of waste products and/or electrolyte may remain in the device after the processes for removing these components have been performed. However, removal of substantially most of the electrolyte and/or waste products may be sufficient to restore satisfactory energy storage and/or conversion device performance.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of processing an energy storage and/or conversion device, comprising:
   discharging the energy storage and/or conversion device;
   removing an electrolyte from the energy storage and/or conversion device by extraction via a supercritical fluid; and
   adding a new quantity of electrolyte to the energy storage and/or conversion device after removing waste products from the energy storage and/or conversion device.

2. The method of claim 1, wherein discharging the energy storage and/or conversion device includes placing the energy storage and/or conversion device in an electrically conductive fluid.

3. The method of claim 1, wherein discharging the energy storage and/or conversion device includes discharging the energy storage and/or conversion device via external circuitry.

4. The method of claim 1, wherein removing the electrolyte from the energy storage and/or conversion device includes removing at least a portion of the electrolyte with a centrifuge before exposing the device to the supercritical fluid.

5. The method of claim 1, wherein removing the electrolyte from the energy storage and/or conversion device includes removing the electrolyte with a supercritical fluid using static extraction.

6. The method of claim 1, wherein the supercritical fluid comprises supercritical carbon dioxide.

7. The method of claim 1, wherein the supercritical fluid comprises an aprotic moiety.

8. The method of claim 1, wherein the energy storage and/or conversion device comprises a battery.

9. The method of claim 8, wherein the battery is for at least one of an electric vehicle and a hybrid electric vehicle.

10. The method of claim 1, further comprising recharging the energy storage and/or conversion device after adding a new quantity of electrolyte.

11. A method of refurbishing a used lithium-containing energy storage and/or conversion device, the energy storage and/or conversion device including electrodes and an electrolyte, the method comprising:

removing at least a portion of the used electrolyte from the energy storage and/or conversion device with a supercritical fluid; and adding a new quantity of electrolyte to the energy storage and/or conversion device after removal of at least a portion of the used electrolyte.

12. The method of claim 11, further comprising discharging the energy storage and/or conversion device before removing the electrolyte.

13. The method of claim 12, wherein discharging the energy storage and/or conversion device includes placing the energy storage and/or conversion device in an electrically conductive fluid.

14. The method of claim 13, wherein placing the energy storage and/or conversion device in an electrically conductive fluid includes placing the energy storage and/or conversion device in an aqueous salt solution.

15. The method of claim 12, wherein discharging the energy storage and/or conversion device includes discharging the energy storage and/or conversion device via external electrical circuitry.

16. The method of claim 12, wherein discharging the energy storage and/or conversion device includes exposing the energy storage and/or conversion device to carbon dioxide thereby causing the production of oxalate within the energy storage and/or conversion device.

17. The method of claim 11, wherein removing at least a portion of the electrolyte includes removing at least some of the electrolyte by centrifuging the energy storage and/or conversion device.

18. The method of claim 11, wherein removing at least a portion of the electrolyte includes removing at least some of the electrolyte by exposing the electrolyte to a supercritical fluid using a static extraction.

19. The method of claim 11, wherein the supercritical fluid comprises supercritical carbon dioxide.

20. The method of claim 19, further comprising charging the energy storage and/or conversion device after adding a new quantity of electrolyte to the energy storage and/or conversion device.

21. In a hybrid electric or electric vehicle, a method of rejuvenating a battery having reduced performance, the method comprising:

discharging the battery;

removing electrolyte from the battery with a supercritical fluid;

adding a new quantity of electrolyte to the battery; and recharging the battery.

22. The method of claim 21, wherein the electrolyte is removed via extraction with a fluid comprising supercritical carbon dioxide.

23. The method of claim 1, wherein removing the electrolyte from the energy storage and/or conversion device includes removing the electrolyte with a supercritical fluid using dynamic extraction.

24. The method of claim 11, wherein removing at least a portion of the electrolyte includes removing at least some of the electrolyte by exposing the electrolyte to a supercritical fluid using a dynamic extraction.

* * * * *